U. S. ARMSTRONG.
METHOD OF GALVANIZING PIPE.
APPLICATION FILED SEPT. 15, 1913.
1,159,820.
Patented Nov. 9, 1915.
FIG. 1
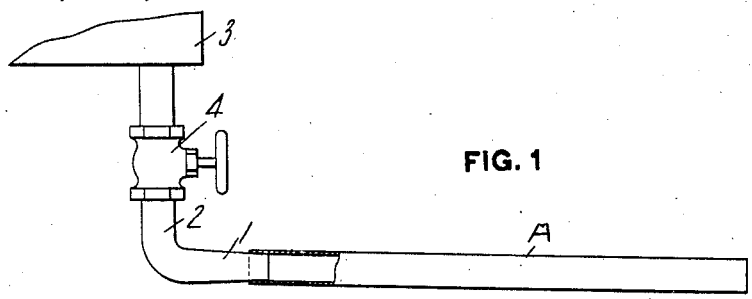
FIG. 2
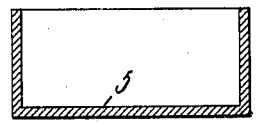
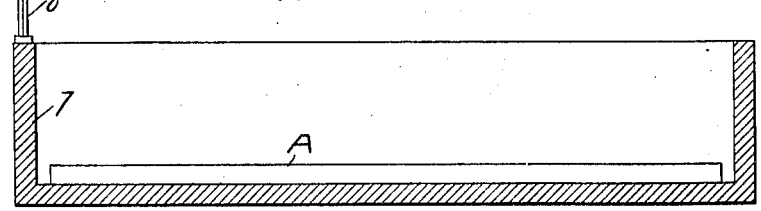
FIG. 3
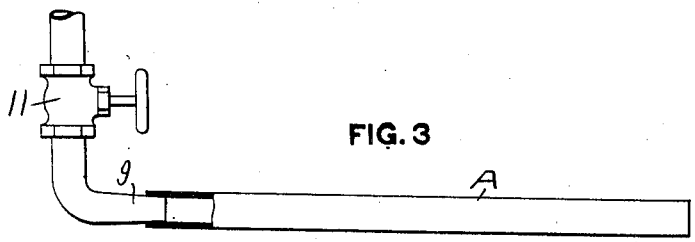
FIG. 4    FIG. 6    FIG. 5
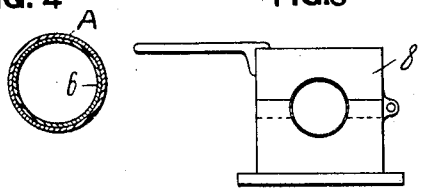
WITNESSES
INVENTOR

UNITED STATES PATENT OFFICE.

ULYSSES S. ARMSTRONG, OF NEW KENSINGTON, PENNSYLVANIA.

METHOD OF GALVANIZING PIPE.

1,159,820.   Specification of Letters Patent.   Patented Nov. 9, 1915.

Application filed September 15, 1913. Serial No. 789,841.

*To all whom it may concern:*

Be it known that I, ULYSSES S. ARMSTRONG, a resident of New Kensington, in the county of Westmoreland and State of Pennsylvania, have invented a new and useful Improvement in Methods of Galvanizing Pipe, of which the following is a specification.

This invention relates to a method of coating iron or steel pipes or conduits, such as are used for electric wires and the like.

The invention has particular reference to a method of producing pipes or conduits which are galvanized or provided with a protecting layer of metal on one surface but not on the other.

For many purposes, such as for carrying electric wires, users of iron or steel conduits or pipes prefer to have the inner surface of the pipe either uncoated or finished with a smooth elastic coating, applied directly to the iron or steel, and preferably a coating of enamel, either air drying or baked. One reason is that ordinary uncoated iron or steel pipe or tubing, or the same tubing provided with a coating of elastic enamel or the like, has a comparatively smooth interior surface and offers little, if any, obstruction to wires being drawn therethrough. When the inner surface of such a pipe is coated with lead, zinc or the like, its surface is usually made rougher than if left uncoated. Moreover, it is difficult to apply a thin layer or coating of metal to the inside of a pipe, as the excess metal cannot be easily wiped out or removed and forms nodules or lumps. Also, a thick layer is expensive and is more liable to peal off or crack than a thin layer. Furthermore, a zinc or metallic coating is not so necessary on the inside of the pipe as on the outside, since the inside of the pipe is protected from the access of water or moisture and is not so liable to rust.

Some attempts have been made to avoid the rough surface of the coating metal on the inside of the pipe by applying thereto a second coating of enamel. Such enamels have various compositions, but generally include linseed oil and some form of bitumen or asphalt. They may be either air drying or may be baked on, but usually have a smooth surface and are very flexible. Combination coatings of this kind, however, are objectionable for the reason that when the pipe or tube is bent, the double layer of zinc or enamel flakes or peels off, thus causing rough surfaces or sharp edges in the pipe, which obstruct the passage of wires therethrough. This, however, is not the case with an enameled coating applied directly to the surface of the steel or iron, for the reason that enamel applied in this way clings tenaciously to the surface and permits the pipe to be bent or distorted without cracking or flaking the enameled surface, thereby leaving a smooth raceway for wiring. The combination coatings are also objectionable because some metallic coatings are very brittle, and, in the case of zinc, some mechanical or chemical action seems to take place between the zinc and enamel, making the latter very brittle so that it is not durable and easily cracks and breaks.

Heretofore, in producing pipes with an uncoated inner surface, it has been necessary to either cap or plug both ends of the pipe before immersing it in the galvanizing bath, to thereby prevent the bath metal from coating or adhering to the inner surface of the pipe. This has always been an expensive operation, either necessitating threading the pipe and screwing metal caps on both ends thereof or the use of wooden plugs, which are driven into the ends of the pipe. The threaded caps are expensive and labor cost of applying them is high. The wooden plugs are also expensive, since they are usually charred by the heat of the bath and can be used only a limited number of times. Moreover, the length of pipe which can be plugged by a single laborer is, also, limited.

My invention does away entirely with capping or plugging of the ends of the pipe and greatly decreases the labor cost. It is designed to overcome the objections to prior pipes or conduits, and to furnish a simple and improved method of galvanizing or metal coating the outer surface of the pipe, while leaving its inner surface not galvanized, or metal coated.

In the drawings, which represent diagrammatically apparatus suitable for carrying out the invention, Figure 1 illustrates apparatus for coating the inner surface of the pipe with enamel; Fig. 2 represents a sectional elevation of the galvanizing tank; Fig. 3 represents diagrammatically apparatus for cleaning the inside of the pipe; Fig. 4 is a cross section of the tube with the enamel coating applied to the inner surface thereof; Fig. 5 is a similar view showing the completed tube; and Fig. 6 is a detail view of a scraper.

According to my invention the pipe is first pickled in the usual manner, such as by immersing it in sulfuric acid solution, which attacks the film or coating of oxid thereon and removes the same together with any silica or silicates which may be present. The pipe is then immersed in a rinsing bath of clear water to remove all traces of the sulfuric acid. The inner surface of the pipe is then provided with a coating or layer of some substance which is unaffected by and is impervious to the action of water, moisture, acids, or the like, and which is also capable of preventing adherence of the molten zinc to the steel or iron surface, such as mica paint, but preferably enamel or other composition. If enamel is used, it may be of any type, either air drying or a baked enamel, but is preferably one of the enamels ordinarily termed varnish, lacquer or Japan, or other suitable composition of oil and gum. The substance may be applied in any suitable manner, such as by pouring it through or into the pipe. As shown, one end of the pipe A is placed over a nipple or nozzle 1 on the end of a pipe or conduit 2, communicating with the reservoir 3. The regulating valve 4 is opened and a stream of the coating material is allowed to flow through the pipe into a receiving tank 5, leaving a thin coat 6, as shown in Fig. 4. The valve 4 is shut off and the excess material allowed to drain from the pipe. The coating is then allowed to dry or is baked hard in an oven, in accordance with the type of material used. The pipe with its inner coating may now be again pickled in a second pickling bath of muriatic acid, which further cleans the outer surface but does not attack the inner surface thereof and which coöperates with the flux in the galvanizing tank and promotes the galvanizing action. The pipe is next coated or galvanized with lead or zinc in the usual or any preferred manner, for example, according to the method shown, described and claimed in my prior Patent 1012048, dated Dec. 19, 1911. As shown in the drawings the pipe is immersed in or is drawn through the molten galvanizing bath, which is contained in a tank 7 and is kept in a molten condition by a suitable furnace. The pipe is then withdrawn from the bath and is passed through a suitable cleaning or wiping die 8, which removes the surplus metal from the outer surface of the pipe but leaving a thin coat 12 thereon, as shown in Fig. 5. The ends of the pipe when it is immersed in the coating bath are left open, and the bath flows through said pipe as well as around the same. The molten bath is at a comparatively high temperature and attacks the coating on the interior surface of the pipe, practically completely burning or consuming the same. Usually faint traces of ashes of the coating remain. The coating, however, prevents the molten bath metal from reaching or touching the bare surface of the steel or iron on the inside of the pipe, and therefore does not adhere thereto or coat thereon. When the pipe is removed from the galvanizing tank, the bath metal is allowed to drain out from the inside of the pipe and flow back into the tank. After passing through the scraping die 8 the inside of the pipe is subjected to a cleaning operation to remove therefrom any traces of ash of the coating remaining in the pipe, together with any nodules or lumps of the bath metal which may have solidified in the pipe before they could flow out therefrom. This may be done in any suitable manner, such as by a brushing operation on a machine like that shown in my prior Patent 1012049, dated Dec. 19, 1911, but preferably by passing a stream of air or steam and an abrasive, such as sand, therethrough. This cleaning stream is supplied from a nozzle 9 having a regulating valve 11 and over which the end of the pipe is placed. The pipe may be then immersed in a rinsing bath of clear water or a blast of clean air or steam may be passed therethrough to remove the last traces of the abrasive material. The pipe may then have its interior walls provided with a coating 10 of enamel, or the like, to protect its inner surface against corrosion, as well as to give it a smooth polished surface and thereby eliminate, so far as possible, frictional resistance to the drawing in of wires.

The method described is simple and can be carried out with ordinary apparatus, such as is usually found in galvanizing plants. It does away entirely with the expense of capping or plugging the ends of the pipe and is a much more economical method. A single laborer can coat the inner surface of approximately 20,000 feet of pipe per day, the labor cost, together with the cost of enamel, being much less than the cost of plugging or capping, and, in addition, saving the metal which would otherwise be used for coating the inner surface.

What I claim is:

1. The method of galvanizing iron or steel pipes or conduits, consisting in pickling the pipe in an acid cleaning bath, applying to one surface thereof a coating or layer which is unaffected by water or acids, subjecting the pipe to an acid cleaning bath to free its uncoated surface of oxid, and passing the pipe through a bath of molten coating metal to thereby coat the cleaned surface thereof with metal.

2. The method of galvanizing iron or steel pipes or conduits, consisting in pickling the pipe in an acid cleaning bath, applying to the inner surface thereof a coating layer which is unaffected by water or acids, subjecting the pipe to an acid cleaning bath to free the outer surface thereof of oxid, and passing the pipe through a bath of molten coating metal to thereby coat the outer cleaned surface of the pipe with metal.

3. The method of galvanizing iron or steel pipes or conduits, consisting in applying to one surface thereof a partially combustible coating or layer which is unaffected by water or acids and the residue of which after combustion is capable of preventing the adherence of the bath metal thereto, subjecting the pipe to an acid cleaning bath, and passing the pipe through a bath of molten coating metal to thereby coat its other surface and partly consume the first named coating.

4. The method of galvanizing iron or steel pipes or conduits, consisting in applying to the inner surface thereof a partially combustible coating or layer which is unaffected by water or acids and the residue of which after combustion is capable of preventing the adherence of the bath coating metal thereto, subjecting the pipe to an acid cleaning bath, and passing it through a bath of molten coating metal to thereby coat its outer surface and partly consume the first named coating on the inner surface thereof.

5. The method of galvanizing iron or steel pipes or conduits, consisting in pickling the pipe in an acid cleaning bath, applying to one surface thereof a partially combustible coating or layer which is unaffected by water or acids and the residue of which after combustion is capable of preventing the adherence of the bath metal thereto, subjecting the pipes to an acid cleaning bath, and passing the pipe through a bath of molten coating metal to thereby coat its other surface and partly consume the first named coating.

6. The method of galvanizing iron or steel pipes or conduits, consisting in pickling the pipe in an acid cleaning bath, applying to the inner surface thereof a partially combustible coating or layer which is unaffected by water or acids and the residue of which after combustion is capable of preventing the adherence of the bath coating metal thereto, subjecting the pipe to an acid cleaning bath, and passing it through a bath of molten coating metal to thereby coat its outer surface and partly consume the first named coating on the inner surface thereof.

In testimony whereof, I have hereunto set my hand.

ULYSSES S. ARMSTRONG.

Witnesses:
 ELBERT L. HYDE,
 GLENN H. LERESCHE.